United States Patent
Chang et al.

(10) Patent No.: US 7,386,215 B1
(45) Date of Patent: Jun. 10, 2008

(54) PROJECTION SYSTEM AND LIGHT TUNNEL THEREOF

(75) Inventors: Kuang-Hua Chang, Taipei (TW); Chih-Huang Wang, Taipei County (TW); Jie-Hyi Chang, Taipei Hsien (TW); Shiau-Wu Lai, Taipei County (TW); Kai Hsiung Tsao, Taipei (TW); Guang-Yu Yu, Taipei County (TW); Wen-Hu Wang, Taipei (TW)

(73) Assignee: Prodisc Technology Inc., Taipei Hsien (TW)

( * ) Notice: Subject to any disclaimer, the term of this patent is extended or adjusted under 35 U.S.C. 154(b) by 0 days.

(21) Appl. No.: 11/729,788

(22) Filed: Mar. 30, 2007

(30) Foreign Application Priority Data

Dec. 28, 2006 (TW) .............................. 95149599 A (51) Int. Cl.
*G02B 6/00* (2006.01)
*G02B 5/126* (2006.01)
*G03B 21/00* (2006.01)

(52) U.S. Cl. ...................... 385/133; 385/134; 359/535; 353/122

(58) Field of Classification Search ................ 385/133, 385/134, 129, 146; 359/535; 353/122
See application file for complete search history.

(56) References Cited

U.S. PATENT DOCUMENTS

| 3,170,980 | A | * | 2/1965 | Pritchard | ..................... 385/133 |
| 5,224,200 | A | * | 6/1993 | Rasmussen et al. | ......... 385/146 |
| 6,517,210 | B2 | * | 2/2003 | Peterson et al. | .............. 353/98 |
| 6,625,380 | B2 | * | 9/2003 | Wagner | ...................... 385/146 |
| 7,120,346 | B2 | * | 10/2006 | Sawanaka | .................... 385/133 |
| 7,210,822 | B2 | * | 5/2007 | Liu | ............................. 362/297 |
| 2004/0126077 | A1 | * | 7/2004 | Strobl et al. | ................ 385/133 |
| 2006/0227424 | A1 | * | 10/2006 | Wang et al. | ................ 359/535 |

* cited by examiner

*Primary Examiner*—Brian M Healy
(74) *Attorney, Agent, or Firm*—Birch, Stewart, Kolasch & Birch, LLP (57) ABSTRACT

A light tunnel includes a first optical element, a second optical element, a third optical element and a fourth optical element. The first optical element has a first recess. The second optical element is disposed opposite to the first optical element and has a second recess. The third optical element connects the first optical element with the second optical element and has one end disposed in the first recess or the second recess. The fourth optical element is disposed opposite to the third optical element, connects the first optical element with the second optical element, and has one end disposed in the first recess or the second recess. Inner surfaces of the first to fourth optical elements form a light passage. A projection system is also disclosed.

16 Claims, 6 Drawing Sheets

PROJECTION SYSTEM AND LIGHT TUNNEL THEREOF

CROSS REFERENCE TO RELATED APPLICATIONS

This Non-provisional application claims priority under 35 U.S.C. §119(a) on Patent Application No(s). 095149599 filed in Taiwan, Republic of China on Dec. 28, 2006, the entire contents of which are hereby incorporated by reference.

BACKGROUND OF THE INVENTION

1. Field of Invention

The invention relates to a display system and a light tunnel thereof, and, in particular, to a projection system and a light tunnel thereof.

2. Related Art

Due to demands for large display area and compact, light-weight systems, image projection systems have now become one of the most popular products in the opto-electronic industry.

Figure 1:
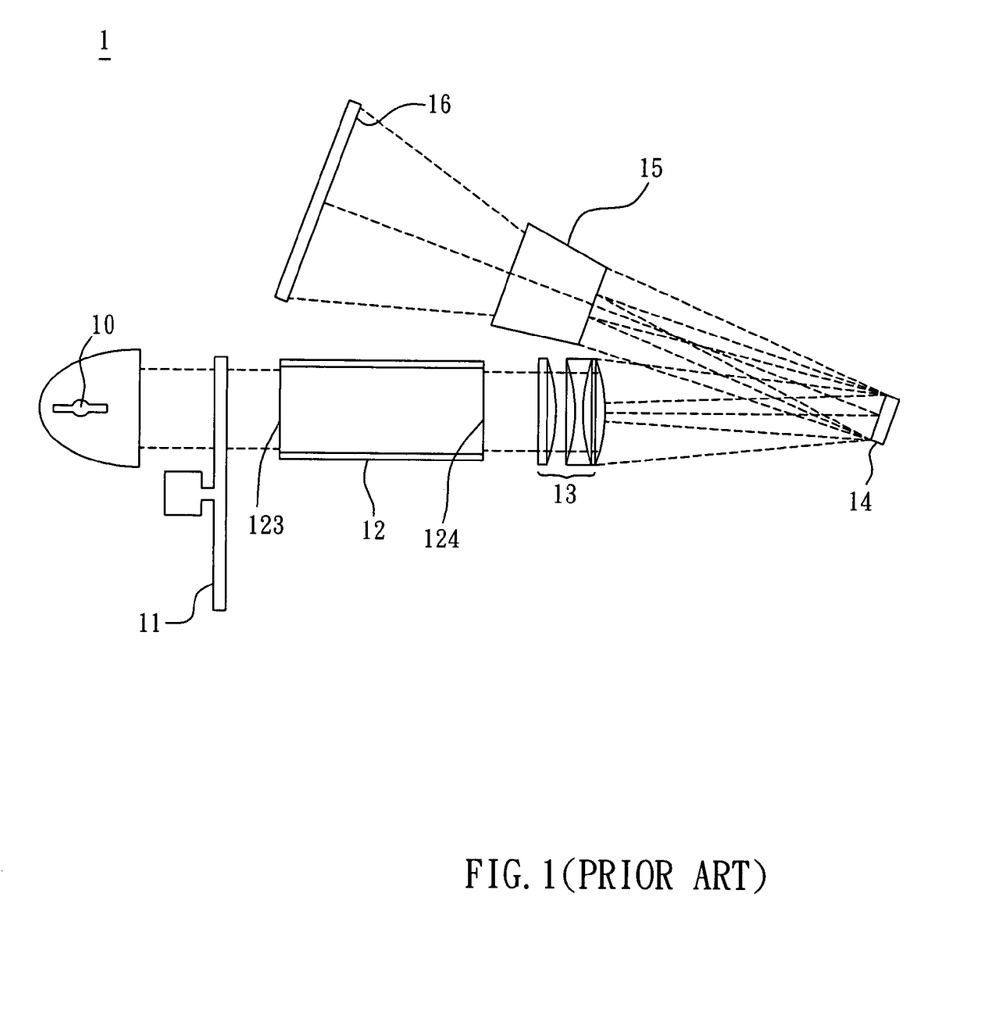
FIG. 1 is a schematic illustration showing a conventional projection system.

Referring to FIG. 1, an image projection system, hereinafter referred to as a projection system 1, has a light source 10, a color wheel assembly 11, a light tunnel 12, a lens assembly 13, a digital micro-mirror device (DMD) 14 and a projecting unit 15. The light source 10 emits light to the color wheel assembly 11 and then into the light tunnel 12. Then, the lens assembly 13 focuses the light onto the DMD 14. Driving electrodes are provided to control tilt angles and deflection times of micro mirrors (not shown) on the DMD 14 to switch reflection directions of the light, and then the light is projected onto a screen 16 through the projecting unit 15 for imaging.

Figure 2:
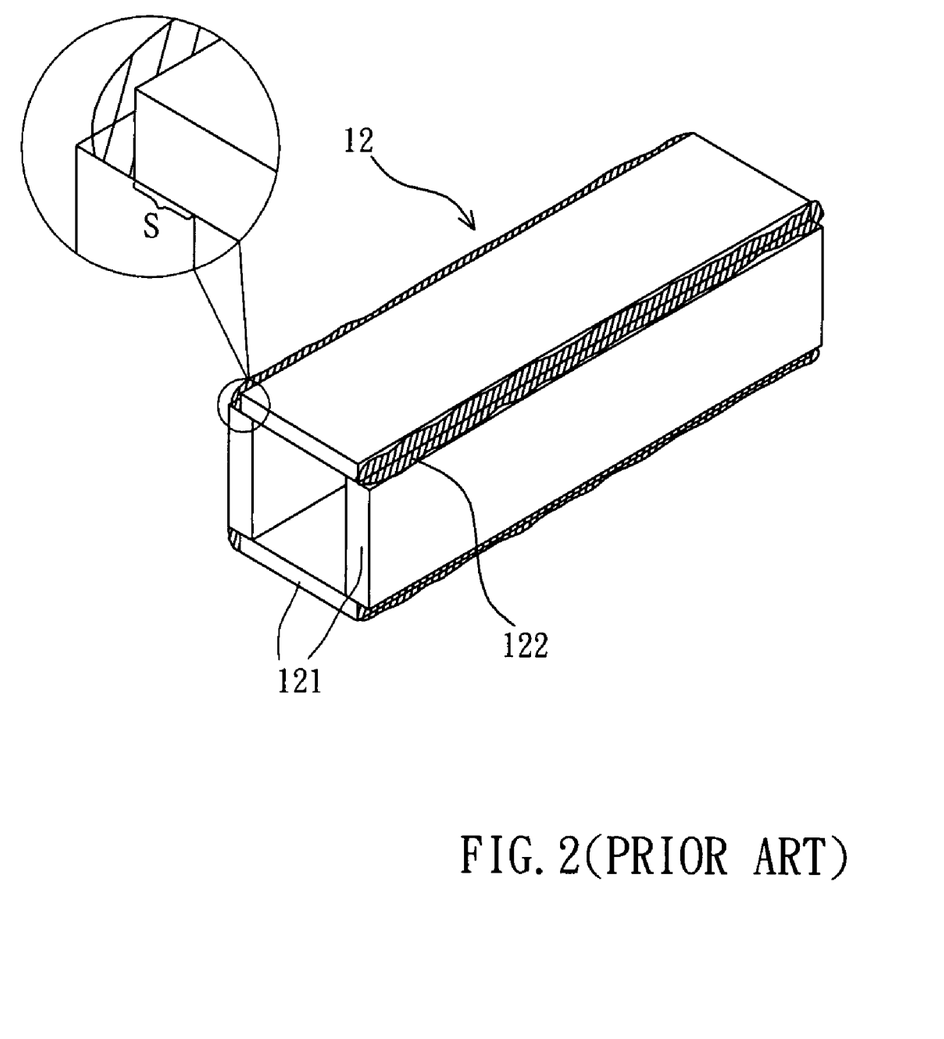
FIG. 2 is a schematic illustration showing a conventional light tunnel.

Referring to FIGS. 1 and 2, the conventional light tunnel 12 is mainly composed of four optical elements 121, which are assembled using a jig to fix the four optical elements 121. Then, an adhesive 122 is applied to all the junctions between adjacent pairs of optical elements 121 so that the optical elements 121 can be combined together. Because inner surfaces of the light tunnel 12 have reflective layers, the light emitted from the light source 10 enters the light tunnel 12 through an inlet 123, then is reflected by the reflective layers many times, and then is outputted from an outlet 124 so that the luminance of the light becomes uniform.

However, because a space for the adhesive 122 has to be left between the optical elements 121, a contact surface S between the optical elements 121 is smaller, as shown in FIG. 2. When an external force is applied to the light tunnel 12, the optical elements 121 may be separated due to insufficient structural integrity so that the efficiency of the light tunnel 12 is adversely influenced. In addition, because the temperature of the light emitted from the light source 10 is very high, the environmental temperature is elevated such that the adhesive 122 of the light tunnel 12 adjacent to the light source 10 tends to become brittle. Similarly, the structural intensity between the optical elements 121 of the light tunnel 12 is insufficient and the optical elements 121 tend to separate from one another.

SUMMARY OF THE INVENTION

In view of the foregoing, the invention is to provide a projection system and a light tunnel thereof having the better structural intensity.

To achieve the above, the invention discloses a light tunnel including a first optical element, a second optical element, a third optical element and a fourth optical element. The first optical element has a first recess. The second optical element is disposed opposite to the first optical element and has a second recess. The third optical element connects the first optical element with the second optical element and has one end disposed in the first recess or the second recess. The fourth optical element is disposed opposite to the third optical element, connects the first optical element with the second optical element, and has one end disposed in the first recess or the second recess. Inner surfaces of the first optical element, the second optical element, the third optical element and the fourth optical element form a light passage.

To achieve the above, the invention also discloses a projection system including a light source, a color wheel assembly and a light tunnel. The color wheel assembly is disposed on one side of the light source. The light tunnel is disposed between the light source and the color wheel assembly or disposed on one side of the color wheel assembly opposite to the light source. The light tunnel has a first optical element, a second optical element, a third optical element and a fourth optical element. The first optical element has a first recess. The second optical element is disposed opposite to the first optical element and has a second recess. The third optical element connects the first optical element with the second optical element, and has one end disposed in the first recess or the second recess. The fourth optical element is disposed opposite to the third optical element, connects the first optical element with the second optical element, and has one end disposed in the first recess or the second recess. Inner surfaces of the first optical element, the second optical element, the third optical element and the fourth optical element form a light passage.

As mentioned above, the optical elements have the recesses in the projection system and the light tunnel thereof according to the invention so that one end of one optical element may be combined with the recess of another optical element. Consequently, no space for accommodating the adhesive has to be formed in each optical element of the light tunnel so that the light tunnel has better structural intensity. Compared with the prior art structure, the structural intensity of the light tunnel of the invention cannot be easily influenced by the brittle adhesive caused by heat or by the external pressure. In addition, the provision of the concave portion at each recess of each optical element enables the optical element superior precision of assembly. In addition, the positions and the number of the recesses of each optical element according to the invention may be modified to satisfy the actual requirements in various applications.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The light tunnel according to the first embodiment of the invention will be described with reference to FIGS. 3 and 4.

Figure 3:
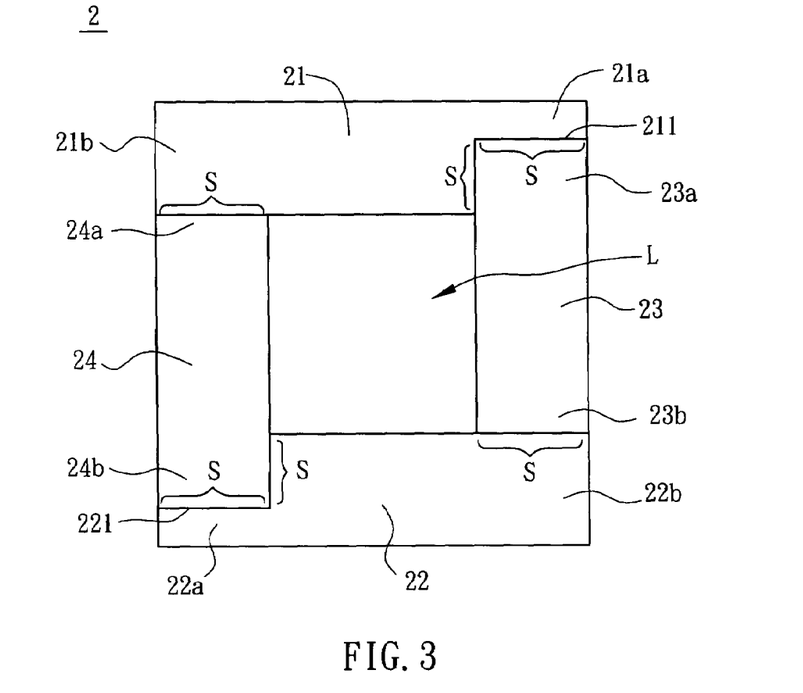
FIG. 3 is a schematic illustration showing a light tunnel according to a first embodiment of the invention.

Referring to FIG. 3, the light tunnel 2 includes a first optical element 21, a second optical element 22, a third optical element 23 and a fourth optical element 24.

In this embodiment, the first optical element 21 has a first recess 211 located at one end 21a of the first optical element 21.

In addition, the second optical element 22 is disposed opposite to the first optical element 21, and the second optical element 22 has a second recess 221. In this embodiment, the second recess 221 is located at one end 22a of the second optical element 22.

The third optical element 23 connects the first optical element 21 with the second optical element 22, and has one end disposed in the first recess 211 or the second recess 221. In this embodiment, one end 23a of the third optical element 23 is disposed in the first recess 211 of the first optical element 21, and the other end 23b of the third optical element 23 contacts the other end 22b of the second optical element 22.

The fourth optical element 24 connects the first optical element 21 with the second optical element 22, and has one end disposed in the first recess 211 or the second recess 221. Inner surfaces of the first optical element 21, the second optical element 22, the third optical element 23 and the fourth optical element 24 form a light passage L. In this embodiment, one end 24a of the fourth optical element 24 contacts the other end 21b of the first optical element 21, and the other end 24b of the fourth optical element 24 is disposed in the second recess 221 of the second optical element 22.

According to the above-mentioned structure, in which one end 23a of the third optical element 23 is disposed in the first recess 211 of the first optical element 21, and the other end 24b of the fourth optical element 24 is disposed in the second recess 221 of the second optical element 22, larger contact surfaces S between the first optical element 21, the second optical element 22, the third optical element 23 and the fourth optical element 24 may be obtained. So, the light tunnel 2 may have improved structural intensity.

Of course, the positions of the first recess of the first optical element and the second recess of the second optical element may be modified according to the actual condition.

Figure 4:
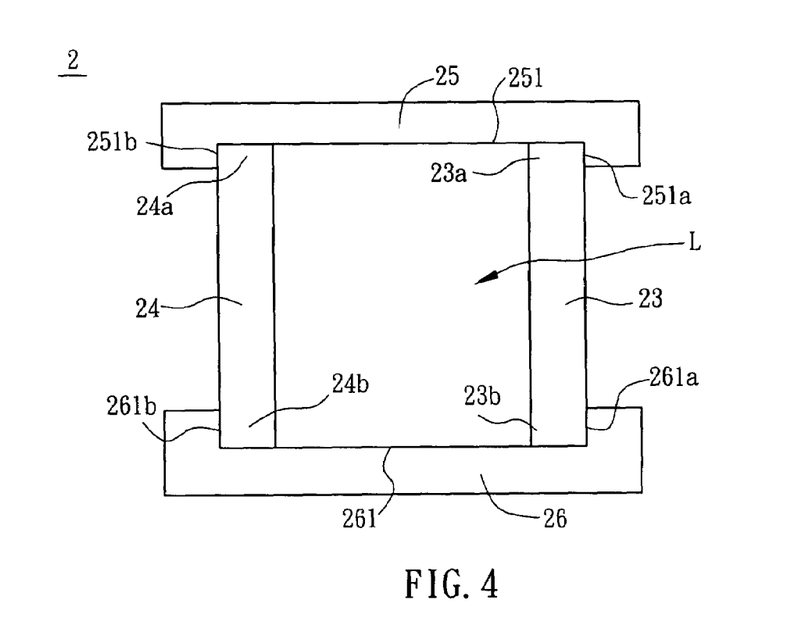
FIG. 4 is another schematic illustration showing the light tunnel according to the first embodiment of the invention.

As shown in FIG. 4, a first recess 251 of a first optical element 25 is located at a central region of the first optical element 25, and a second recess 261 of a second optical element 26 is located at a central region of the second optical element 26. In this case, the third optical element 23 and the fourth optical element 24 may be respectively disposed in the first recess 251 and the second recess 261. The one end 23a and the other end 23b of the third optical element 23 respectively contact one wall surface 251a of the first recess 251 and one wall surface 261a of the second recess 261. The two ends 24a and 24b of the fourth optical element 24 respectively contact the other wall surface 251b of the first recess 251 and the other wall surface 261b of the second recess 261.

Figure 5:
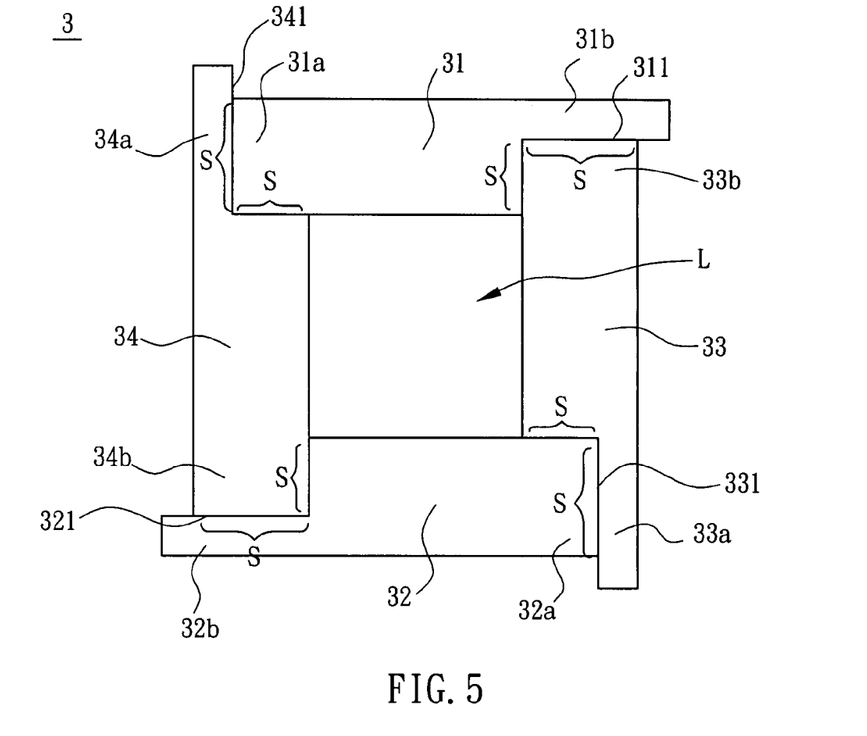
FIG. 5 is a schematic illustration showing a light tunnel according to a second embodiment of the invention.

Referring next to FIG. 5, a light tunnel 3 according to the second embodiment of the invention has a first optical element 31, a second optical element 32, a third optical element 33 and a fourth optical element 34.

In this embodiment, the first optical element 31 has a first recess 311, and the second optical element 32 has a second recess 321, wherein the positions of the first recess 311 and the second recess 321 are the same as those of the first recess 211 of the first optical element 21 and the second recess 221 of the second optical element 22 according to the first embodiment.

In addition, the third optical element 33 has a third recess 331, and the third recess 331 is located at one end 33a of the third optical element 33. In this case, the other end 33b of the third optical element 33 is disposed in the first recess 311 of the first optical element 31 and one end 32a of the second optical element 32 is disposed in the third recess 331 of the third optical element 33.

In addition, fourth optical element 34 has a fourth recess 341 located at one end 34a of the fourth optical element 34. In this case, the other end 34b of the fourth optical element 34 is disposed in the second recess 321 of the second optical element 32, and one end 31a of the first optical element 31 is disposed in the fourth recess 341 of the fourth optical element 34.

According to the above-mentioned structure, the one end 31a of the first optical element 31 is disposed in the fourth recess 341 of the fourth optical element 34, the one end 32a of the second optical element 32 is disposed in the third recess 331 of the third optical element 33, the other end 33b of the third optical element 33 is disposed in the first recess 311 of the first optical element 31, and the other end 34b of the fourth optical element 34 is disposed in the second recess 321 of the second optical element 32. Similarly, inner surfaces of the first optical element 31, the second optical element 32, the third optical element 33 and the fourth optical element 34 form a light passage L. In addition, larger contact surfaces S between the optical elements 31, 32, 33 and 34 may be obtained so that the light tunnel 3 has improved structural intensity.

In practice, the number of first recesses of the first optical element and the number of the second recesses of the second optical element may be modified according to practical requirements.

Figure 6:
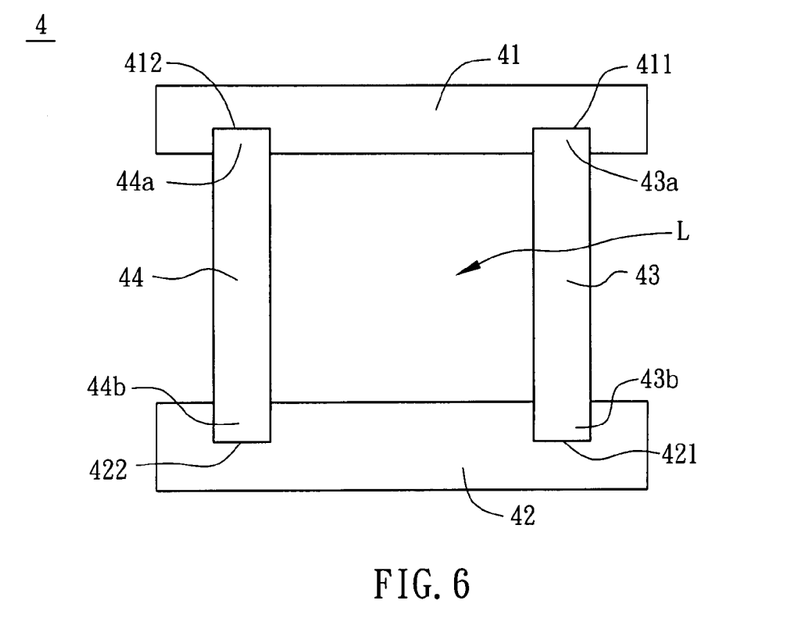
FIG. 6 is a schematic illustration showing a light tunnel according to a third embodiment of the invention.

Referring to FIG. 6, a light tunnel 4 according to the third embodiment of the invention has a first optical element 41, a second optical element 42, a third optical element 43 and a fourth optical element 44.

In this embodiment, the first optical element 41 has two first recesses 411 and 412, which are respectively adjacent to two ends of the first optical element 41.

In addition, the second optical element 42 is disposed opposite to the first optical element 41, and the second optical element 42 has two second recesses 421 and 422, which are adjacent to two ends of the second optical element 42 and are disposed corresponding to the first recesses 411 and 412, respectively.

One end 43a of the third optical element 43 is disposed in the first recess 411 of the first optical element 41, and the other end 43b of the third optical element 43 is disposed in the second recess 421 of the second optical element 42.

One end 44a of the fourth optical element 44 is disposed in the first recess 412 of the first optical element 41, and the other end 44b of the fourth optical element 44 is disposed in the second recess 422 of the second optical element 42.

Figure 7:
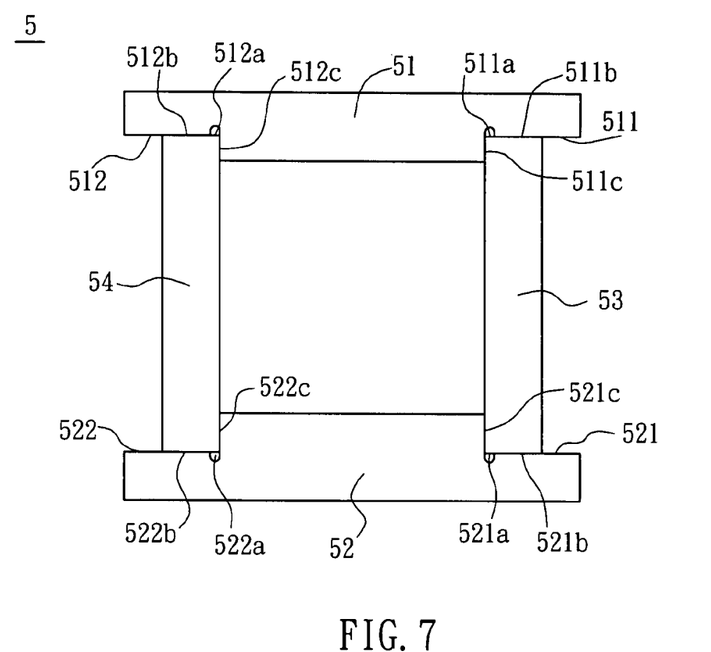
FIG. 7 is a schematic illustration showing a light tunnel according to a fourth embodiment of the invention.

Referring to FIG. 7, a light tunnel 5 according to the fourth embodiment of the invention has a first optical element 51, a second optical element 52, a third optical element 53 and a fourth optical element 54.

In this embodiment, the first optical element 51 has two first recesses 511 and 512, and the second optical element 52 has two second recesses 521 and 522. However, the first recesses 511 and 512 and the second recesses 521 and 522 are disposed closer to two ends of the first optical element 51 and the second optical element 52 than the first recesses 411 and 412 and the second recesses 421 and 422 of the third embodiment, respectively. Thus, the third optical element 53 and the fourth optical element 54 of this embodiment still may be respectively disposed in the first recesses 511 and 512 of the first optical element 51 and the second recesses 521 and 522 of the second optical element 52, respectively, in a manner the same as that for the third optical element 43 and the fourth optical element 44 of the third embodiment.

The difference between this embodiment and the third embodiment will be described in the following. The first recesses 511 and 512 respectively have concave portions 511a and 512a, and the second recesses 521 and 522 further respectively have concave portions 521a and 522a. In this embodiment, a surface of each of the recesses 511, 512, 521 and 522 is substantially L-shaped, and the concave portions 511a, 512a, 521a and 522a are respectively disposed on bottom surfaces 511b, 512b, 521b and 522b of the L-shaped recesses 511, 512, 521 and 522. Of course, it is also possible to dispose the concave portions 511a, 512a, 521a and 522a on wall surfaces 511c, 512c, 521c and 522c of the L-shaped recesses 511, 512, 521 and 522, respectively.

When two ends of the third optical element 53 and two ends of the fourth optical element 54 are respectively disposed in the first recesses 511 and 512 and the second recesses 521 and 522, the concave portions 511a, 512a, 521a and 522a are respectively adjacent to one end of the corresponding third optical element 53 or fourth optical element 54. Thus, the third optical element 53 and the fourth optical element 54 may be in tight contact with the bottom surfaces 511b, 512b, 521b and 522b of the recesses 511, 512, 521 and 522.

Of course, the concave portion may also be disposed between each recess and each optical element in the first to third embodiments. Consequently, each optical element can be precisely aligned and positioned so that the light tunnel can be assembled with greater precision. It is thus possible to prevent the arced edge of the recess from being formed with insufficient machining precision and thereby adversely affecting the precision of the light tunnel.

In addition, the first optical element and the second optical element may also have different shapes.

Figure 8:
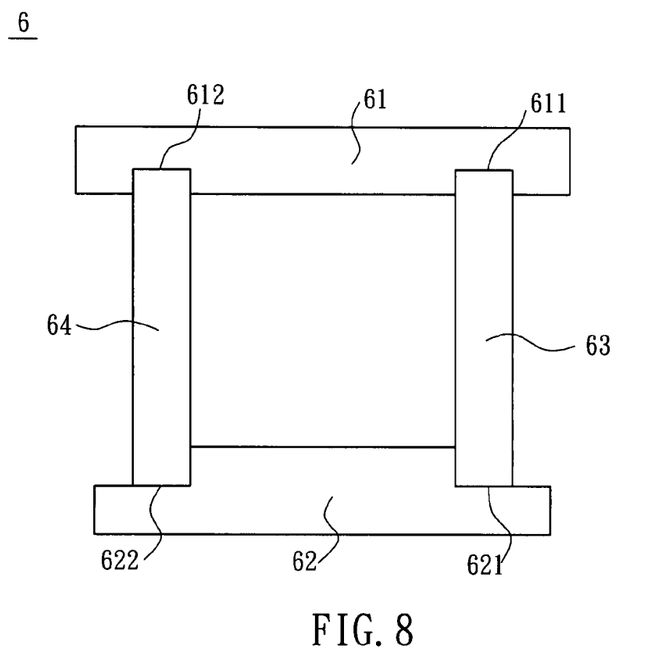
FIG. 8 is a schematic illustration showing a light tunnel according to a fifth embodiment of the invention.

Referring to FIG. 8, a light tunnel 6 according to the fifth embodiment of the invention has a first optical element 61, a second optical element 62, a third optical element 63 and a fourth optical element 64. The first optical element 61 has two first recesses 611 and 612. In this embodiment, the positions of the first recesses 611 and 612 of the first optical element 61 are the same as those of the first recesses 411 and 412 of the first optical element 41 of the third embodiment (see FIG. 6).

In addition, the second optical element 62 has two second recesses 621 and 622 disposed corresponding to the first recesses 611 and 612 of the first optical element 61, respectively. In this embodiment, the positions of the second recesses 621 and 622 of the second optical element 62 are the same as those of the second recesses 521 and 522 of the second optical element 52 of the fourth embodiment (see FIG. 7).

Consequently, two ends of the third optical element 63 are respectively disposed in the first recess 611 and the second recess 621, and two ends of the fourth optical element 64 are respectively disposed in the first recess 612 and the second recess 622.

At last, a projection system 7 according to a sixth embodiment of the invention will be described with reference to FIG. 9.

The projection system 7 has a light source 70, a color wheel assembly 71, a light tunnel 72, a lens assembly 73, a digital micro-mirror device 74 and a projecting unit 75. The color wheel assembly 71 is disposed adjacent to one side of the light source 70, and the light tunnel 72 may be disposed between the light source 70 and the color wheel assembly 71 or disposed on one side of the color wheel assembly 71 opposite to the light source 70.

Figure 9:
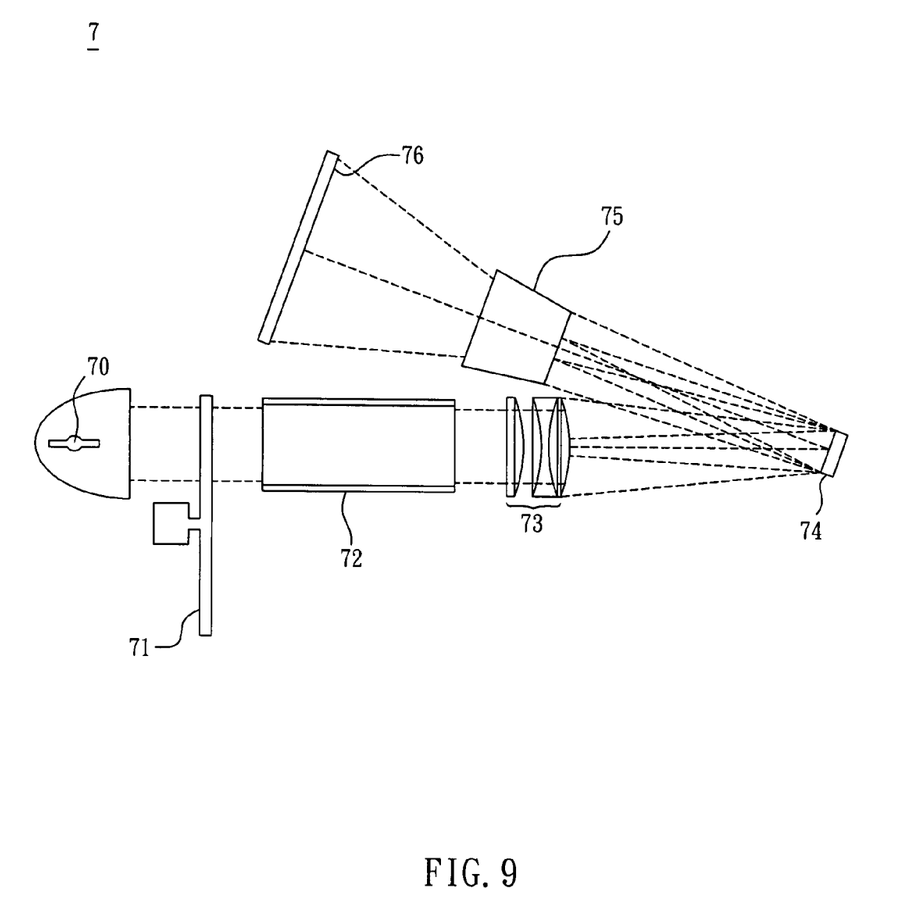
FIG. 9 is a schematic illustration showing a projection system according to a sixth embodiment of the invention.

In the example of FIG. 9, the light tunnel 72 is disposed on one side of the color wheel assembly 71 opposite to the light source 70. The light of the light source 70 is imaged on a screen 76 through the color wheel assembly 71, the light tunnel 72, the lens assembly 73, the digital micro-mirror device 74 and the projecting unit 75 according to the prior art, so detailed descriptions thereof will be omitted.

In addition, the structure of the light tunnel 72 of this embodiment may be the same as that of the light tunnel 2, 3, 4, 5 or 6 of the first, second, third, fourth or fifth embodiment, so detailed descriptions thereof will be omitted.

In summary, the optical elements have the recesses in the projection system and the light tunnel thereof according to the invention so that one end of one optical element may be combined with the recess of another optical element. Consequently, no space for accommodating the adhesive has to be formed in each optical element of the light tunnel so that the light tunnel has better structural intensity. Compared with the prior art structure, the structural intensity of the light tunnel of the invention cannot be easily influenced by the brittle adhesive caused by heat or by the external pressure. In addition, the provision of the concave portion at each recess of each optical element enables the optical element superior precision of assembly. In addition, the positions and the number of the recesses of each optical element according to the invention may be modified to satisfy the actual requirements in various applications.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light tunnel, comprising:
   a first optical element having a first recess;
   a second optical element, which is disposed opposite to the first optical element and has a second recess;
   a third optical element, which connects the first optical element with the second optical element and has one end disposed in the first recess or the second recess; and a fourth optical element, which is disposed opposite to the third optical element, connects the first optical element with the second optical element, and has one end disposed in the first recess or the second recess, wherein inner surfaces of the first optical element, the second optical element, the third optical element and the fourth optical element form a light passage, the first recess has a concave portion disposed adjacent to the end of the third optical element or the fourth optical element.

2. The light tunnel according to claim 1, wherein the second recess has a concave portion disposed adjacent to the end of the third optical element or the fourth optical element.

3. The light tunnel according to claim 1, wherein the first recess is disposed in a central region of the first optical element or one end of the first optical element.

4. The light tunnel according to claim 1, wherein the second recess is disposed in a central region of the second optical element or one end of the second optical element.

5. The light tunnel according to claim 1, wherein the third optical element has a third recess, one end of the first optical element or one end of the second optical element is disposed in the third recess, the third recess has a concave portion disposed adjacent to the end of the first optical element or the second optical element, and the third recess is disposed in the end of the third optical element.

6. The light tunnel according to claim 1, wherein the fourth optical element has a fourth recess, one end of the first optical element or one end of the second optical element is disposed in the fourth recess, the fourth recess has a concave portion disposed adjacent to the end of the first optical element or the second optical element, and the fourth recess is disposed in the end of the fourth optical element.

7. The light tunnel according to claim 1, wherein two ends of the third optical element are respectively disposed in the first recess and the second recess.

8. The light tunnel according to claim 1, wherein two ends of the fourth optical element are respectively disposed in the first recess and the second recess.

9. A projection system, comprising: a light source; a color wheel assembly disposed on one side of the light source; and
a light tunnel disposed between the light source and the color wheel assembly or disposed on one side of the color wheel assembly opposite to the light source, the light tunnel having a first optical element, a second optical element, a third optical element and a fourth optical element, wherein the first optical element has a first recess; the second optical element is disposed opposite to the first optical element and has a second recess; the third optical element connects the first optical element with the second optical element and has one end disposed in the first recess or the second recess; the fourth optical element is disposed opposite to the third optical element, connects the first optical element with the second optical element, and has one end disposed in the first recess or the second recess; and inner surfaces of the first optical element, the second optical element, the third optical element and the fourth optical element form a light passage the first recess has a concave portion disposed adjacent to the end of the third optical element or the fourth optical element.

10. The projection system according to claim 9, wherein the second recess has a concave portion disposed adjacent to the end of the third optical element or the fourth optical element.

11. The projection system according to claim 9, wherein the first recess is disposed in a central region of the first optical element or one end of the first optical element.

12. The projection system according to claim 9, wherein the second recess is disposed in a central region of the second optical element or one end of the second optical element.

13. The projection system according to claim 9, wherein the third optical element has a third recess, one end of the first optical element or one end of the second optical element is disposed in the third recess, the third recess has a concave portion disposed adjacent to the end of the first optical element or the second optical element, and the third recess is disposed in the end of the third optical element.

14. The projection system according to claim 9, wherein the fourth optical element has a fourth recess, one end of the first optical element or one end of the second optical element is disposed in the fourth recess, the fourth recess has a concave portion disposed adjacent to the end of the first optical element or the second optical element, and the fourth recess is disposed in the end of the fourth optical element.

15. The projection system according to claim 9, wherein two ends of the third optical element are respectively disposed in the first recess and the second recess.

16. The projection system according to claim 9, wherein two ends of the fourth optical element are respectively disposed in the first recess and the second recess.

* * * * *